Feb. 1, 1949.  R. E. MAES  2,460,426
PULSATOR FOR MILKING MACHINES
Filed March 9, 1945  2 Sheets-Sheet 1
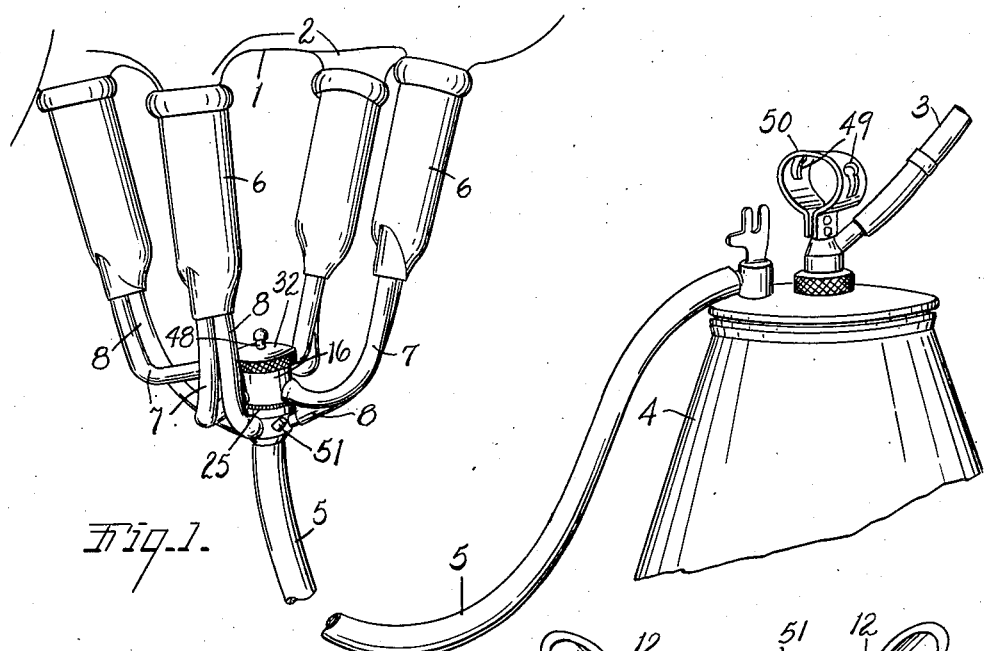
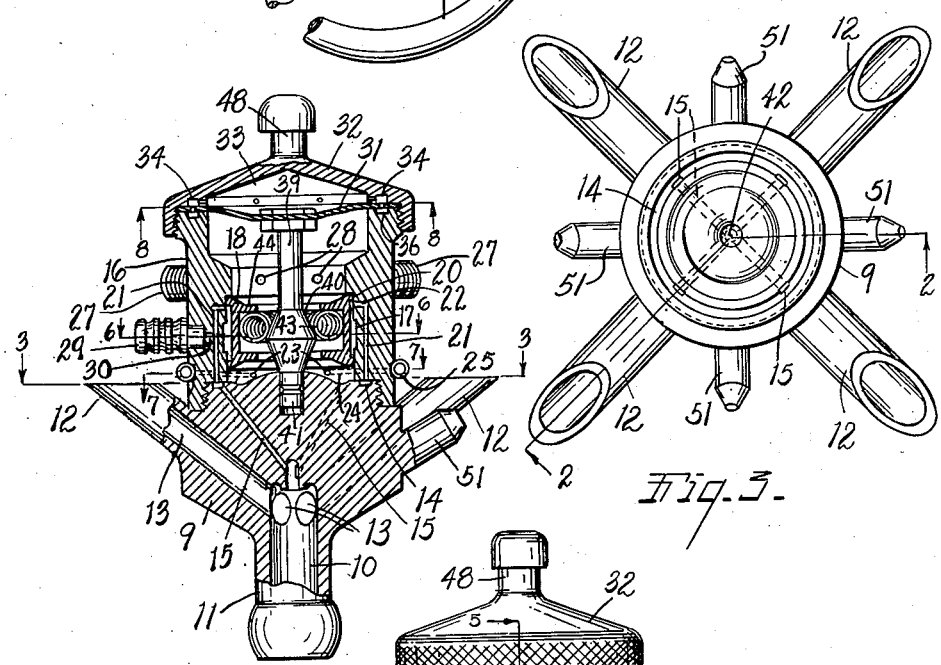
INVENTOR.
Robert E. Maes
BY Earl H. Chappell
ATTORNEYS.

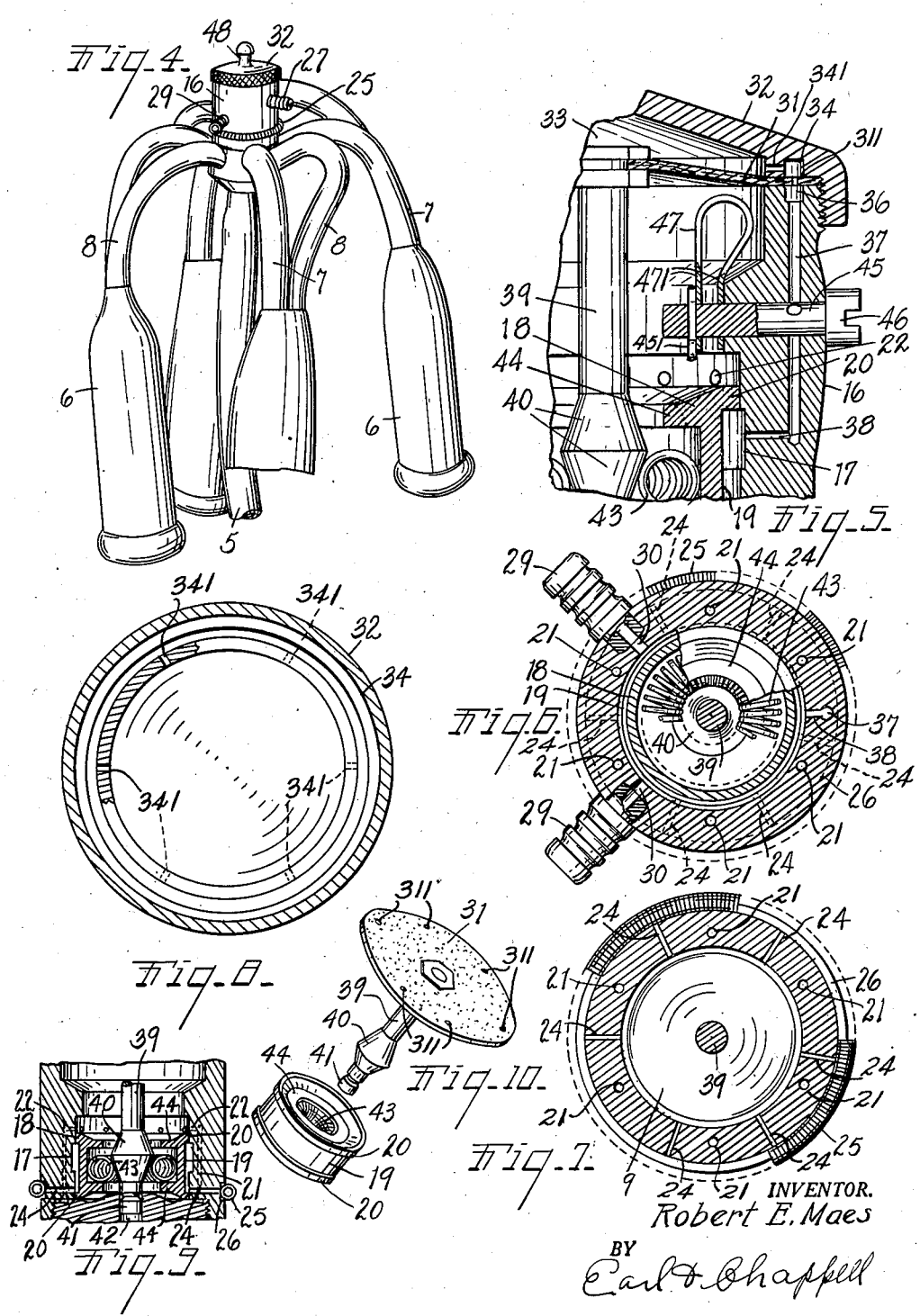

Patented Feb. 1, 1949

2,460,426

UNITED STATES PATENT OFFICE 2,460,426

PULSATOR FOR MILKING MACHINES

Robert E. Maes, Marshall, Mich.

Application March 9, 1945, Serial No. 581,906

13 Claims. (Cl. 31—63)

1

This invention relates to improvements in pulsators for milking machines.

The main objects of this invention are:

First, to provide a pulsator unit for milking machines which is relatively compact and in which the parts are so arranged that the weight to which the teat cups are subjected is uniformly distributed.

Second, to provide a pulsator unit including the teat cups which may be easily kept in a sanitary condition.

Third, to provide a pulsator unit which is easily handled in applying the teat cups and removing them.

Fourth, to provide a pulsator unit which is not likely to become inoperative but one in which the operating parts are readily accessible.

Objects relating to details and economies of the invention will appear from the description to follow. The invention is defined and pointed out in the claims.

A preferred embodiment of the invention is illustrated in the accompanying drawings, in which:

Fig. 1 is a fragmentary perspective view of a milking machine embodying my invention with a set of teat cups shown in operative relation to the teats of a cow.

Fig. 2 is a fragmentary view mainly in vertical section on line 2—2 of Fig. 3 of a pulsator unit embodying the invention.

Fig. 2—A is a fragmentary side elevation of the upper portion of the pulsator unit looking from the right of Fig. 5.

Fig. 3 is a plan view of the base member of the pulsator unit taken on line 3—3 of Fig. 2.

Fig. 4 is a fragmentary perspective view of the assembly including the teat cups and their connecting conduits, the pulsator conduits being disengaged from their nipples and engaged with supporting studs provided therefor on the base member.

Fig. 5 is an enlarged fragmentary view mainly in section on line 5—5 of Fig. 2—A.

Fig. 6 is an enlarged fragmentary view mainly in section on line 6—6 of Fig. 2.

Fig. 7 is an enlarged fragmentary view mainly in section on line 7—7 of Fig. 2.

Fig. 8 is a fragmentary view partially in section on line 8—8 of Fig. 2.

Fig. 9 is an enlarged fragmentary view showing the relation of certain of the ports to the reciprocating valve.

Fig. 10 is a disassembled perspective view of the diaphragm and the valve.

In the accompanying drawings, 1 represents the udder of a cow and 2 the teats. 3 represents a connection to a vacuum line and 4 a container to which the vacuum line of the conduit is connected and 5 a conduit for connecting the pulsator teat cup assembly to the container and through it to the vacuum line. The teat cups 6 are of conventional type and have pulsating conduits 7 connected thereto and also discharge conduits 8.

My improved pulsator unit comprises a base member 9 having a vacuum chamber 10 therein, the base having a depending nipple 11 adapted to receive the vacuum conduit 5. This base member is formed as an integral casting and is provided with upwardly diverging peripherally spaced nipples 12 with which the conduits 8 are engaged. The nipples 12 are connected by the passages 13 to the chamber 10.

At its upper end, the base member is provided with an annular groove-like passage 14 connected to the chamber 10 by the passages 15.

The casing member 16 is provided with a valve cylinder portion 17 receiving the reciprocating valve 18. This valve 18 is provided with a reduced central portion 19 providing annular cylinder wall engaging members 20 at each end thereof. This minimizes friction and also serves additional functions which will be brought out as the description proceeds.

The valve casing member is provided with vacuum passages 21 opening to the valve cylinder through the ports 22, these passages opening to the annular passage 14 in the base member when the casing member is threaded upon the base member or in assembled relation thereto as shown in Fig. 2.

The valve cylinder is provided with atmospheric air ports 23 communicating with the atmosphere through passages 24, the outer ends of these passages being provided with a screen 25 in the form of a coiled spring, the spring being located in a peripheral groove 26 in the casing. The cylinder is provided with a pair of nipples 27 opening to the cylinder at 28 in a plane above the valve and a second pair of nipples 29 opening to the valve cylinder at 30, see Fig. 6.

With this arrangement, atmospheric air and vacuum are alternately applied to the pairs of teat cups, the purpose being to some extent simulate nature in the action on the udder. I do not, however, claim novelty in that result but only in the means by which I accomplish it. When the valve is at the end of its up-stroke, as shown in Fig. 2, the vacuum is cut off from the nipple ports 28 and is applied to the nipple ports 30, the ports 28 being subjected to atmospheric air. When the valve is in its down-stroke as shown in Fig. 9, the atmospheric air is cut off from the ports 28 and vacuum is applied thereto through the ports 22, at the same time the vacuum is cut off from the nipple ports 30 and atmospheric air is connected thereto.

The valve is actuated with a snap action, this being accomplished in the embodiment illustrated by providing an actuating diaphragm 31, the edges of which are clamped between the casing cap 32 and the end of the casing member. The cap is preferably threaded upon the casing member although it might be otherwise detachably connected. This diaphragm forms a partition across the casing chamber providing a diaphragm chamber 33. The cap has an annular groove-like passage 34 in its under side opposing a similarly groove-like passage 36 at the end of the valve casing, see Fig. 2. Openings 341 through the inner wall of the annular passage 34 connect said passage to the diaphragm chamber 33, and openings 311 through the diaphragm 31 connect the passage 36 to the passage 34.

The casing has a longitudinal passage 37 opening to the passage 36 and having a lateral port 38 opening to the cylinder as shown in Fig. 5. Inasmuch as the space between the valve and its cylinder is alternately subjected to vacuum and atmospheric air the passage 37 and consequently the diaphragm chamber 33 is alternately subjected to vacuum and atmospheric air, this chamber being in communication with the passage 34 through the ports or openings 341.

The diaphragm is provided with a stem 39 having a double cone-shaped cam 40 thereon, the lower end of the stem having a guide 41 reciprocating in a recess 42 provided therefor, see Fig. 9. This cam coacts with a coiled spring 43 which is arranged between a pair of inwardly projecting flanges 44 on the valve so that the spring alternately shifts from one flange to the other as it snaps over the cam and thus the valve is actuated with a snap action. Again, I would state that snap acting valves have long been in use in pulsators and in other relations but so far as I am aware none having the features of my present invention.

To control the pulsations I provide the passage 37 with a regulating valve 45, this being a rotatable valve and having a head 46 adapted to receive a screw driver or the like, the valve being frictionally held in its adjusted positions by means of the bowed spring 47 having the arms 471 thereof apertured to receive the stem of the valve 45, and having said arms compressed towards each other between the inside wall of the casing member 16 and a pin 451 passing through the valve stem, see Fig. 5.

The cap 32 is provided with a headed stud 48 which is engageable with one of the key hole slots 49 in the hand-hold 50 on the receptacle 4. This is a matter of convenience in carrying the unit.

In the embodiment illustrated, the base member is provided with studs 51 between its nipples 12 which are adapted to be engaged by the teat cup conduit members 7 when they are disengaged from the pulsator nipples, the parts then being as shown in Fig. 4. With the teat cup conduits engaged as there shown the casing may be removed for cleaning or sterilizing and the base with its parts attached thereto can be readily cleaned and sterilized by dropping as a unit into hot water or subjected to necessary manipulation.

The pulsator assembly including the teat cups is well balanced—that is, the pull on the teats resulting from the weight of the unit is well distributed. Also, the teat cups are so connected to the pulsator that the teat cups may be very conveniently applied to or disengaged from the teats. The rapidity of the pulsations may be very accurately controlled and controlled through a wide range.

I have not attempted to illustrate or describe certain embodiments or adaptations of my improvements as it is believed that this disclosure will enable those skilled in the art to embody or adapt my invention as may be desired.

Having thus described my invention, what I claim as new and desire to secure by Letters Patent is:

1. A pulsator unit for milking machines comprising a chambered base member having a central depending vacuum connection nipple and peripherally spaced upwardly diverging teat cup connection nipples communicating with said chamber, said base also having an annular passage in its upper side communicating with its chamber, a casing member threaded upon said base member and constituting a wall for said annular passage and having a valve cylinder with vacuum ports at its upper end communicating with said annular passage and atmospheric ports at its lower end, said casing having spaced teat cup pulsating connection nipples opening thereto, a cap member threaded upon said casing member, a diaphragm disposed with its edges between said cap member and the upper end of said casing member and providing a diaphragm chamber, said casing member being provided with a passage opening to said diaphragm chamber and to the said valve cylinder between its said vacuum and atmospheric ports, a reciprocating valve adapted to alternately connect said vacuum ports and said atmospheric ports to said teat cup nipples and to said diaphragm passage, a stem on said diaphragm disposed centrally through said valve and having sliding engagement with said base member, said stem being provided with a double cone cam, and an annular coiled spring arranged within said valve coacting with said cam whereby the valve is actuated with a snap action through the actuation of said diaphragm.

2. A pulsator unit for milking machines comprising a chambered base member having a central depending vacuum connection nipple and peripherally spaced upwardly diverging teat cup connection nipples communicating with said chamber, said base also having an annular passage in its upper side communicating with its chamber, a casing member threaded upon said base member and constituting a wall for said annular passage and having a valve cylinder with vcuum ports at its upper end communicating with said annular passage and atmospheric ports at its lower end, said casing having spaced teat cup pulsating connection nipples opening thereto, a cap member detachably secured to said casing member, a diaphragm disposed with its edges between said cap member and the upper end of said casing member and providing a diaphragm chamber, said casing member being provided with a passage opening to said diaphragm chamber and to the said valve cylinder between its said vacuum and atmospheric ports, a reciprocating valve adapted to alternately connect said vacuum ports and said atmospheric ports to said teat cup nipples and to said diaphragm passage, a stem on said diaphragm disposed centrally through said valve and having sliding engagement with said base member, said stem being provided with a double cone cam, and an annular coiled spring arranged within said valve coacting with said cam whereby the valve is actuated with a snap action through the actuation of said diaphragm.

3. A pulsator unit for milking machines comprising a chambered base member having a central depending vacuum connection nipple and peripherally spaced upwardly diverging teat cup connection nipples communicating with said chamber; said base also having an annular passage in its upper side communicating with its chamber; a casing member threaded upon said base member and constituting a wall for said annular passage and having a valve cylinder with vacuum ports at its upper end communicating with said annular passage and atmospheric ports at its lower end; said casing having spaced teat cup pulsating connection nipples opening thereto; a cap member threaded upon said casing member; a diaphragm disposed with its edges between said cap member and the upper end of said casing member and providing a diaphragm chamber; said casing member being provided with a passage opening to said diaphragm chamber and to the said valve cylinder between its said vacuum and atmospheric ports, a reciprocating valve adapted to alternately connect said vacuum ports and said atmospheric ports to said teat cup nipples and to said diaphragm passage, a stem on said diaphragm disposed centrally through said valve and having sliding engagement with said base member, said stem being provided with a double cone cam, and an annular coiled spring arranged within said valve coacting with said cam whereby the valve is actuated with a snap action through the actuation of said diaphragm, said casing being provided with an annular groove aligned with its said atmospheric ports, and a coiled spring embracing said casing and disposed in said groove and constituting a screen for said atmospheric air ports.

4. A pulsator unit for milking machines comprising a base member having a vacuum chamber and peripherally spaced teat cup connection nipples communicating with said chamber; a casing member detachably mounted on said base member and having a valve cylinder with vacuum ports at its upper end connected to said vacuum chamber of said base member and atmospheric ports at its lower end, said casing having peripherally spaced teat cup pulsating connection nipples opening thereto, a cap member detachably mounted on said casing member, a diaphragm disposed with its edges between said cap member and the upper end of said casing member and providing a diaphragm chamber, said casing member being provided with a passage opening to said diaphragm chamber and to the said valve cylinder between said vacuum and atmospheric air ports, a reciprocating valve adapted to alternately open and close said vacuum ports and said atmospheric ports to said teat cup nipples and to said diaphragm chamber, a stem on said diaphragm provided with a cam, and an annular coiled spring arranged within said valve coacting with said cam whereby the valve is actuated with a snap action through the actuation of said diaphragm.

5. A pulsator unit for milking machines comprising a base member having a vacuum chamber and peripherally spaced teat cup connection nipples communicating with said chamber, a casing member detachably mounted on said base member and having a valve cylinder with vacuum ports at its one end connected to said vacuum chamber of said base member and atmospheric ports at its other end; said casing having peripherally spaced teat cup pulsating connection nipples opening thereto, a cap member detachably mounted on said casing member, a diaphragm disposed with its edges between said cap member and the upper end of said casing member and providing a diaphragm chamber, said casing member being provided with a passage opening to said diaphragm chamber and to the said valve cylinder between said vacuum and atmospheric air ports, a reciprocating valve adapted to alternately open and close said vacuum ports and said atmospheric ports to said teat cup nipples and to said diaphragm chamber, a stem on said diaphragm provided with a cam, and an annular coiled spring arranged within said valve coacting with said cam whereby the valve is actuated with a snap action through the actuation of said diaphragm.

6. A pulsator unit for milking machines comprising a base member provided with a vacuum chamber and peripherally spaced teat cup connecting nipples for passage of milk therethrough and communicating with the chamber, said base member having a central depending nipple adapted to receive a vacuum and milk conduit connection, a valve casing member detachably mounted on said base member and provided with ports connected to said vacuum chamber and provided with atmospheric ports, said casing member having spaced teat cup nipples, a cap member detachably mounted on said casing member, a reciprocating valve within said casing acting to alternately connect said vacuum and atmospheric ports to said teat cup nipples, a diaphragm coacting with said cap to provide a diaphragm chamber, said casing being provided with a passage connecting said diaphragm chamber with the interior of said valve casing and opening thereto to be controlled by said valve, operating connections from said diaphragm to said valve, and teat cups each provided with a pair of conduits adapted to be connected to said nipples on said casing and base member.

7. A pulsator unit for milking machines comprising a base member provided with a vacuum chamber and peripherally spaced teat cup connecting nipples for passage of milk therethrough and communicating with the chamber, a valve casing member detachably mounted on said base member and provided with ports connected to said vacuum chamber and provided with atmospheric ports, said casing member having spaced teat cup nipples, a cap member detachably mounted on said casing member, a reciprocating valve within said casing, said valve being cylindrically shaped and having an air passageway in the cylindrical surface thereof acting to alternately connect said vacuum and atmospheric ports to said teat cup nipples upon reciprocation of said valve, a diaphragm coacting with said cap to provide a diaphragm chamber, said casing being provided with a passage connecting said diaphragm chamber with the interior of said valve casing and opening thereto, and operating connections between said diaphragm and said valve.

8. A pulsator unit for milking machines comprising a base member provided with a vacuum chamber and peripherally spaced teat cup connecting nipples communicating with the chamber, a valve casing member detachably mounted on said base member and provided with ports connected to said vacuum chamber and with atmospheric ports, said casing member having peripherally spaced teat cup nipples, a cap member detachably mounted on said casing member, a reciprocating valve within said casing acting to alternately connect said vacuum and atmospheric ports to said teat cup nipples, a diaphragm coacting with said cap to provide a diaphragm chamber, said casing being provided with a passage connecting said diaphragm chamber with the interior of said valve casing and opening thereto in the zone of said vacuum ports to be controlled by said valve, a stem on said diaphragm provided with a cam and a coiled spring carried by said valve and coacting with said cam whereby the valve is actuated by said diaphragm, and a regulating valve for said diaphragm chamber passage.

9. A pulsator unit for milking machines comprising a base member provided with a vacuum chamber and peripherally spaced teat cup connecting nipples for passage of milk therethrough and communicating with the chamber, said base members having a central depending nipple adapted to receive a vacuum and milk conduit connection, a valve casing member detachably mounted on said base member and provided with ports connected to said vacuum chamber and with atmospheric ports, said casing member having peripherally spaced teat cup nipples, a reciprocating valve within said casing acting to alternately connect said vacuum and atmosheric ports to said teat cup nipples, a diaphragm constituting a partition across said casing and providing a diaphragm chamber, said casing being provided with a passage connecting said diaphragm chamber with the interior of said valve casing and opening thereto to be controlled by said valve, operating connections from said diaphragm to said valve whereby the valve is actuated with a snap action, and teat cups provided with a pair of conduits adapted to be connected to said nipples on said casing and base member.

10. A pulsator unit for milking machines comprising a casing assembly provided with a valve cylinder portion having atmospheric air ports at one end and vacuum ports at the other, a valve reciprocating in said cylinder and provided with annular cylinder wall engaging portions at each end thereof and with an annular reduced portion between said cylinder wall portions, said casing having a pair of teat cup ports opening thereto above said cylinder and a second pair opening to said cylinder between said vacuum and atmospheric air ports, said valve being adapted to alternately communicate said pairs of teat cup ports with the vacuum and atmospheric air ports, a diaphragm constituting a partition across said casing and providing a diaphragm chamber, said casing having a passage connecting said diaphragm chamber with said valve cylinder between said atmospheric air and vacuum ports thereof, a stem on said diaphragm provided with a symmetrical double cone cam, and a spring arranged within said valve to coact with said cam, said valve being provided with axially spaced stops with which said spring coacts for reciprocating said valve with a snap action.

11. A pulsator unit for milking machines comprising a casing assembly provided with a valve cylinder portion having atmospheric air ports at one end and vacuum ports at the other, a valve reciprocating in said cylinder and provided with annular cylinder wall engaging portions at each end thereof and with an annular reduced portion between said cylinder wall portions, said casing having a pair of teat cup ports opening thereto above said cylinder and a second pair opening to said cylinder between said vacuum and atmospheric air ports, said valve being adapted to alternately communicate said pair of teat cup ports with the vacuum and atmospheric air ports, a diaphragm constituting a partition across said casing and providing a diaphragm chamber, said casing having a passage connecting said diaphragm chamber with said valve cylinder between said atmospheric air and vacuum ports thereof, a regulating valve for said diaphragm chamber passage, a stem on said diaphragm provided with a cam, and a spring arranged within said valve to coact with said cam whereby said valve is actuated with a snap action.

12. A pulsator unit for milking machines comprising a casing assembly provided with a valve cylinder portion having atmospheric air ports at one end and vacuum ports at the other, a valve reciprocating in said cylinder and provided with annular cylinder wall engaging portions at each end thereof and with an annular reduced portion between said cylinder wall portions, said casing having a pair of teat cup ports opening thereto above said cylinder and a second pair opening to said cylinder between said vacuum and atmospheric air ports, said valve being adapted to alternately communicate said pair of teat cup ports with the vacuum and atmospheric air ports, a diaphragm constituting a partition across said casing and providing a diaphragm chamber, said casing having a passage connecting said diaphragm chamber with said valve cylinder between said atmospheric air and vacuum ports thereof, a stem on said diaphragm provided with a cam, and a spring arranged within said valve to coact with said cam whereby said valve is actuated with a snap action.

13. A pulsator unit for milking machines comprising a base member provided with a vacuum chamber and peripherally spaced teat cup connecting nipples for passage of milk therethrough and communicating with said chamber and provided with a depending nipple adapted to receive a vacuum connection and provided with studs disposed intermediate said teat cup connecting nipples adapted to receive teat cup conduits and constitute supports therefor, a valve casing member detachably mounted on said base member and having spaced teat cup nipples, and teat cups each provided with a pair of conduits adapted to be connected to said nipples on said casing and base members, the ends of the conduits engageable with the nipples on said casing member being engageable with said studs on said base member, whereby said conduit ends may be supported by the base member when the base member with conduits and teat cups is removed as a unit from said casing member.

ROBERT E. MAES.

REFERENCES CITED

The following references are of record in the file of this patent:

UNITED STATES PATENTS

| Number | Name | Date |
|--------|------|------|
| 1,891,983 | Hodsdon | Dec. 27, 1923 |
| 1,500,011 | Smith | July 1, 1924 |
| 1,821,986 | Plint | Sept. 8, 1931 |

FOREIGN PATENTS

| Number | Country | Date |
|--------|---------|------|
| 105,472 | Australia | Oct. 12, 1938 |
| 453,895 | Great Britain | Sept. 21, 1936 |